(12) United States Patent
de Vos et al.

(10) Patent No.: US 7,357,707 B2
(45) Date of Patent: Apr. 15, 2008

(54) METHOD AND APPARATUS FOR HARVESTING AN INNER FILLET FROM POULTRY

(75) Inventors: Ferdinand Allard de Vos, Oostzaan (NL); Johannes Hessel Bouma, Oostzaan (NL); Christiaan Horstman, Oostzaan (NL); Philippus Frederikus Faber, Oostzaan (NL); Martinus Casper Melchior Balthasar Waasdijk, Oostzaan (NL)

(73) Assignee: Meyn Food Processing Technology B.V., Amsterdam (NL)

( * ) Notice: Subject to any disclaimer, the term of this patent is extended or adjusted under 35 U.S.C. 154(b) by 0 days.

(21) Appl. No.: 11/449,563

(22) Filed: Jun. 8, 2006

(65) Prior Publication Data

US 2007/0082595 A1 Apr. 12, 2007

(30) Foreign Application Priority Data

Jun. 10, 2005 (NL) .................................... 1029227

(51) Int. Cl.
*A22C 21/00* (2006.01)
(52) U.S. Cl. ..................................... 452/136
(58) Field of Classification Search ...................... None
See application file for complete search history.

(56) References Cited

U.S. PATENT DOCUMENTS

| | | | | |
|---|---|---|---|---|
| 1,338,452 A | * | 4/1920 | Hunsinger, Sr. ............ | 452/166 |
| 2,068,137 A | * | 1/1937 | Jaeger ......................... | 452/166 |
| 5,015,213 A | * | 5/1991 | Hazenbroek ................. | 452/149 |
| 5,019,013 A | * | 5/1991 | Hazenbroek ................. | 452/151 |
| 5,273,485 A | * | 12/1993 | Hegelmann et al. ........ | 452/179 |
| 5,302,149 A | * | 4/1994 | Witham et al. ............. | 452/135 |
| 5,314,374 A | | 5/1994 | Koch et al. | |
| 5,395,283 A | | 3/1995 | Gasbarro | |
| 5,733,184 A | * | 3/1998 | Curry et al. ................. | 452/138 |
| 5,779,532 A | | 7/1998 | Gagliardi, Jr. | |
| 7,070,493 B2 | * | 7/2006 | Hazenbroek et al. ......... | 452/83 |

FOREIGN PATENT DOCUMENTS

| | | |
|---|---|---|
| EP | 0695506 A2 | 2/1996 |
| EP | 1070456 A1 | 1/2001 |
| JP | 03049639 A | 4/1991 |

OTHER PUBLICATIONS

European Search Report dated Oct. 16, 2006.

* cited by examiner

*Primary Examiner*—Thomas Price
(74) *Attorney, Agent, or Firm*—Dority & Manning, P.A.

(57) ABSTRACT

A method and apparatus is provided for harvesting an inner fillet from poultry, wherein a tendon with which the inner fillet is or was connected to a wing bone of the poultry projects from the inner fillet. The tendon is gripped, and subsequently the tendon and the inner fillet attached thereto are pulled over a predetermined first distance off the carcass part of the poultry so as to completely or partly detach them from the carcass part.

19 Claims, 4 Drawing Sheets

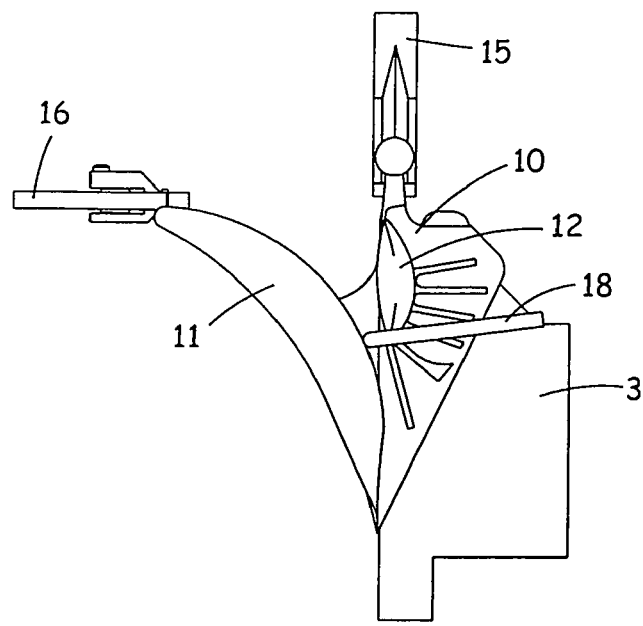
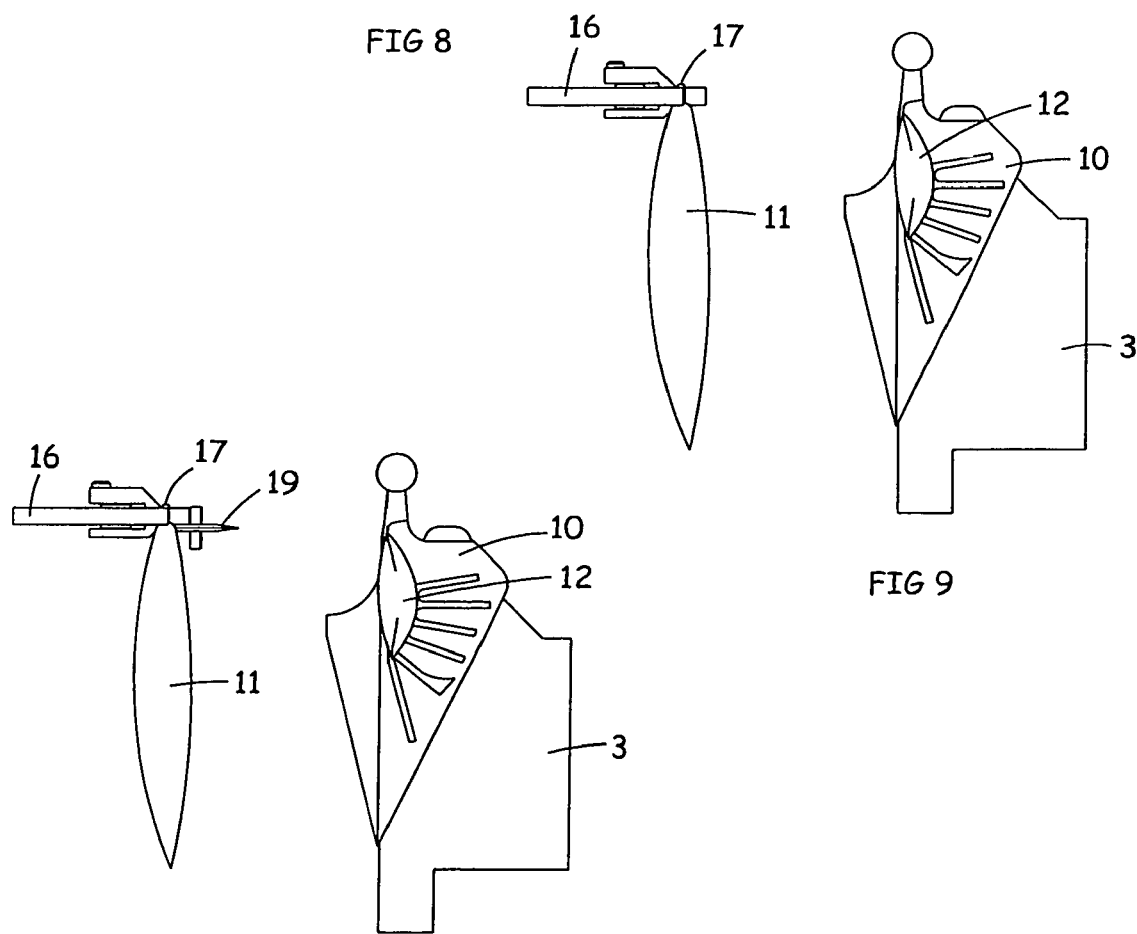
FIG 8
FIG 9
FIG 10

METHOD AND APPARATUS FOR HARVESTING AN INNER FILLET FROM POULTRY

TECHNICAL FIELD OF THE INVENTION

The invention relates to a method and apparatus for harvesting an inner fillet from poultry, wherein a tendon with which the inner fillet is or was connected to a wing bone of the poultry projects from the inner fillet.

Previous methods and apparatus are known for various publications including U.S. Pat. No. 5,314,374, EP-A 0 695 506 and EP-B 1 070 456.

As these publications show, there has long since existed a need for harvesting inner fillets separately from the outer fillets attached to a part of the poultry's carcass.

Usually, there is still a tendon attached to the inner fillet by which it is, or was, attached to the wing bone (humorous). When, during the removal of the wing, the tendon has been severed, it still has a certain length due to the fact that in its natural position it runs through a channel (canalis triosseus) in the end of the collar bone (processus acrocoracoideus of the coracoideum).

It is desirable to harvest the inner fillet without this portion of the tendon projecting from the inner fillet, since it is not valued by the consumer and removing this portion of the tendon afterward is quite laborious.

From U.S. Pat. No. 5,314,374, a method and apparatus are known wherein a series of knives are used for partially separating the inner fillet from the carcass part. In addition, gripping elements are used that grip the partially detached inner fillet and that are designed for pulling the inner fillet off the carcass part. This publication does not, however, mention the removal of the tendon from the inner fillet.

From EP-A 0 695 506, a method and apparatus are known wherein the inner fillets, after removal of wings and after providing a separation in the opening delimited by the wishbone and the breastbone, are scraped off the carcass. A drawback of this known method and apparatus is that the tendon remains attached to the inner fillet.

From the EP EP-B 1 070 456, a method and apparatus are known for harvesting an inner fillet from poultry wherein, while the inner fillet is substantially in its natural position on the carcass, an incision is provided in the inner fillet or in the tendon connected thereto, subsequent to which the inner fillet is removed from the carcass. As can be seen in FIG. 1a of EP-B 1 070 456, this method produces rather inexact results. The transition area between the tendon and the meat of the inner fillet where the incision may be made is quite large, so that he results to be obtained by this method and apparatus vary from a poor yield (through cutting away too much meat) to ineffectiveness (due to a portion of the tendon remaining attached to the inner fillet).

Consequently, there is an urgent need for a method and apparatus providing a high meat yield of superior quality inner fillets that are free from projecting tendons or pieces of tendon.

A first object of the invention is, therefore, to provide a method and apparatus with which this need of the market can be met.

A second object of the invention is to provide an alternative for the prior art methods and devices for harvesting an inner fillet.

A third object is to provide a method and apparatus for, in a reproducible manner, harvesting inner fillets effectively and dependably from a carcass part.

A fourth object of the invention is to provide a method and apparatus for harvesting inner fillets wherein harvesting is fully automated.

These and other objectives of the invention, as well as advantages to be gained thereby and which will become apparent hereinafter, are achieved with a method and apparatus as specified in one or more of the appended claims.

SUMMARY OF THE INVENTION

Objects and advantages of the invention will be set forth in part in the following description, or may be obvious from the description, or may be learned through practice of the invention.

In a first exemplary embodiment of the present invention, an apparatus for harvesting an inner fillet from poultry includes a gripping element for gripping the tendon, wherein the gripping element and a carrier are moveable in relation to each other for completely or partly pulling the inner fillet off the carcass part.

In this way the inner fillet can, in a reproducible manner, be gripped firmly near or at the tendon, preferably as much as possible of the tendon itself so as to avoid the meat of the inner fillet, subsequently pulling it over a predetermined and known first distance off the carcass part so as to completely or partly detach it from the carcass part and, when the inner fillet is completely detached from the carcass part, allowing the tendon to be removed from the inner fillet.

In a further exemplary embodiment of the present invention, an apparatus includes a cutting element and a gripping element. The gripping element and the cutting element can be brought together for cutting through the tendon close to the inner fillet. The removal of the tendon from the inner fillet can in this way be performed accurately and with a simple cutting operation.

In order to facilitate a simple performance of the above described operations, it is useful for the carrier to be designed to carry the carcass part such that the inner fillet is oriented with the tendon on top.

In a further exemplary embodiment of the present invention, the method and apparatus should preferably be embodied such that after the inner fillet has been pulled off the carcass part over a predetermined first distance so that one side of the inner fillet is detached from the carcass part while the rest still being connected, a membrane located between the inner fillet and a subtender is damages in such a manner that when pulling the inner fillet further off the carcass part over a predetermined second distance, the subtender is left on the carcass part. In this way superior quality inner fillets can be harvested at a correspondingly higher profit.

In another exemplary embodiment of the present invention, an apparatus is provided with a scraping element, equipped for damaging a membrane that runs between the inner fillet and a subtender. The desired effect of this scraping element may be optimally realized by embodying the apparatus such that the scraping element is activated after the gripping element and the carrier have assumed a predetermined position in relation to each other.

To effectively and quickly remove the inner fillet while leaving the subtender on the carcass part, the scraping element is, after its activation, moved over a predetermined distance between the inner fillet and the subtender, while simultaneously the gripping element and the carrier move away from each other so as to continue pulling the inner fillet off the carcass part.

The consistency and reproducibility of the grip of the gripping element near or at the tendon is improved by the measure of positioning the inner fillet such that the area of the tendon is in a predetermined position before gripping the same near or at the tendon. To this end, certain exemplary embodiments of the present invention include a wedge to be placed between two inner fillets on the carcass part for positioning the inner fillets near their tendons. As such, the apparatus can be very suitably embodied such that the wedge for positioning the inner fillets engages ends of the collarbones of the poultry.

In still another aspect of the invention, the apparatus includes a carrier incorporated in a conveyor track for transporting the carcass part. It is then desirable for the inner fillet or inner fillets to be harvested while they are being moved along a conveyor track. This allows the inner fillets to be removed completely automatically. It is then also desirable that after removal of the tendon the inner fillets be carried away for further processing, which further processing is preferably also fully automised. To facilitate the automised harvesting of the inner fillets it is desirable for the conveyor track to run past the gripping element and the scraping element. With a view to the transport of the harvested inner fillets, it is further advantageous for the path of the griping element to pass the cutting element and that, in its vicinity, a conveyor be provided for carrying away the inner fillets.

Hereinafter, the invention will be further described with reference to an exemplary embodiment, which does not limit the appended claims, and with references to the drawings. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIGS. 3-10 show various schematically illustrated processing stages in the apparatus according to an exemplary embodiment of the present invention.

Identical reference numerals in the figures refer to similar components.

DETAILED DESCRIPTION OF EMBODIMENTS OF THE INVENTION

Figure 1:
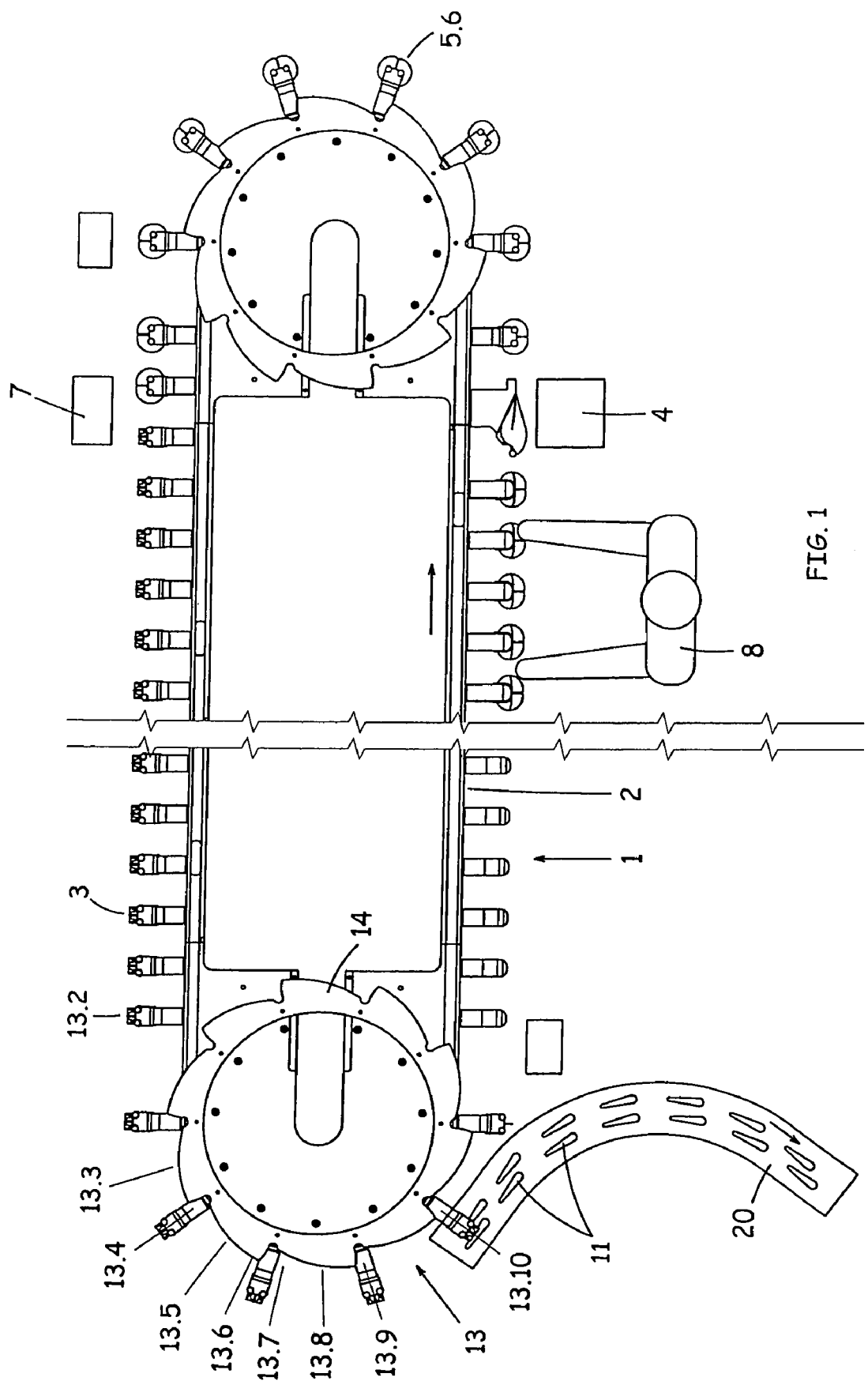
FIG. 1 shows a production line or automatic filleting line incorporating the apparatus according to an exemplary embodiment of the invention.

Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 1A:
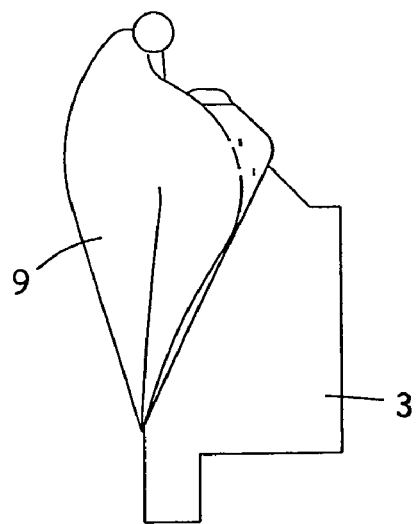
FIG. 1a shows a complete front half such as may be placed at the start of the automatic filleting line shown in FIG. 1.

With reference first to FIG. 1, a top view of a completely automatic filleting line is shown for processing poultry, in particular chicken, according to an exemplary embodiment of the present invention. The automatic filleting line 1 is a modification of the apparatus known from EP-A 1 454 531, and is embodied with a conveyor system 2 that includes carriers 3. On these carriers 3, breast caps or front halves may be placed. Depending on the type of product, the carrier 3 may be adapted with a suitable clamping mechanism and an appropriate impaling technique. The further explanation below will also refer to the use of front halves as shown in FIG. 1a, which illustrates a side view of a front half 9 placed on a carrier 3.

As a rule, the respective front halves or breast caps are manually placed on the carriers 3 by operators 8 (FIG. 1). Of course, it is also possible to have this take place completely automatically.

After the front halves or breast caps have been place on the carriers 3, they pass a skinner 4 and then a wishbone remover and fillet scraper 5, 6. Applicant's earlier European patent application EP-A 1 454 531, which is incorporated here in its entirety by reference, describes in detail the construction and working of the wishbone remover and fillet scraper.

Figure 2:
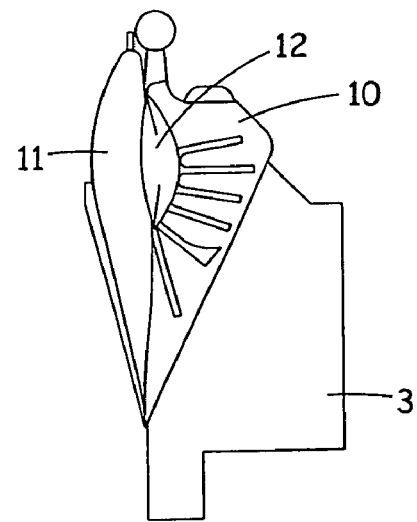
FIG. 2 shows a carcass part such as may be obtained in a first processing stage in the automatic filleting line according to FIG. 1, and to which the apparatus according to an exemplary embodiment of the present invention is applied.

The fillet scraper 6 may be adjusted such that a fillet remover 7, provided thereafter, only needs to remove the outer fillets from the front halves or breast caps, such that the carrier 3 subsequently moving away from the fillet remover 7 carries a carcass part 10 with the inner fillet still attached. The resulting carcass part 10 with a so called laid-open inner fillet 11 is shown in FIG. 2. FIG. 2 further shows that a subtender 12 is attached to the carcass part 10 located near the inner fillet 11 (not yet harvested) and to which carcass part 10 is connected by a membrane, as is well known to the person skilled in the art. The carriers 3, carrying the carcass part 10 shown in FIG. 2, from which the outer fillet has been removed, is subsequently processed further in apparatus 13 (see FIG. 1) for the harvest of the inner fillet 11.

FIG. 1 shows that the apparatus 13 includes a by-pass wheel 14. Around the outside of this bypass wheel 14 reference numerals 13.2 through 13.10 symbolically indicate the stages relating to the process of harvesting the inner fillets 11 according to this exemplary embodiment of the present invention.

The harvest of the inner fillets is also elucidated below with reference to the FIGS. 3 through 10, which correspond to the successive processing stages that are symbolized, as already mentioned, by the reference numerals 13.2 through 13.10 in FIG. 1.

FIG. 2 shows the carrier 3 carrying the carcass part 10 as it arrives at the bypass wheel 14 at the position indicated in FIG. 1 with the reference numeral 13.2.

Figure 3:
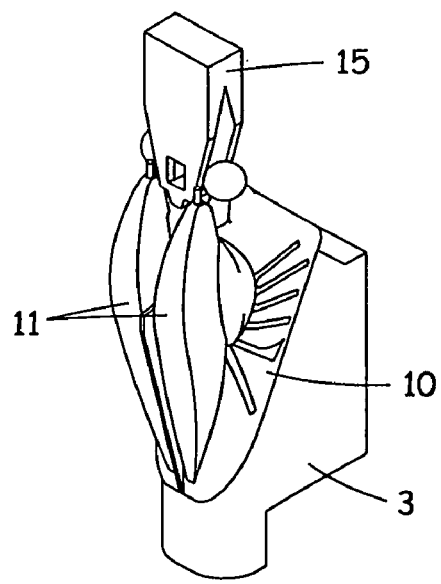

FIG. 1 shows in the vicinity of reference numeral 13.3 the operation schematically illustrated in FIG. 3, wherein a wedge 15 simultaneously forces apart the two inner fillets 11 attached to the carcass part 10, so as to achieve a reproducible positioning of the inner fillets 11 in the vicinity of the tendons attached to them. This occurs preferably by having the wedge 15 engage the collarbones of the poultry, which facilitates exact positioning. Using the teachings disclosed herein, how this is effected will be apparent to the person skilled in the art, rendering further explanation unnecessary.

Figure 4:
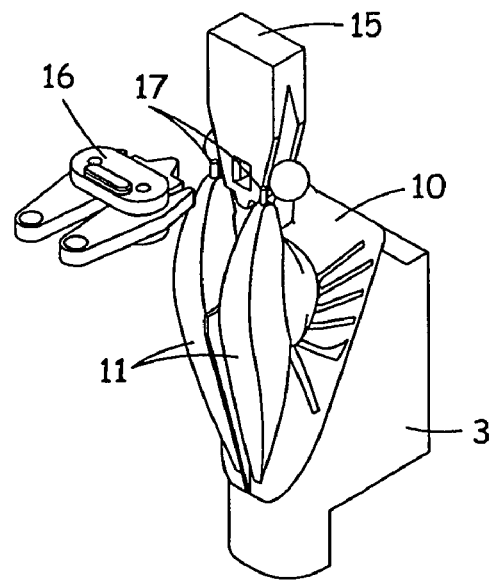

Subsequently, in the vicinity of reference numeral 13.4 (FIG. 1) the step symbolically illustrated in FIG. 4 is carried out. A gripping element 16 is moved to the inner fillets 11 for gripping the tendons 17 of the inner fillets 11.

Figure 5:
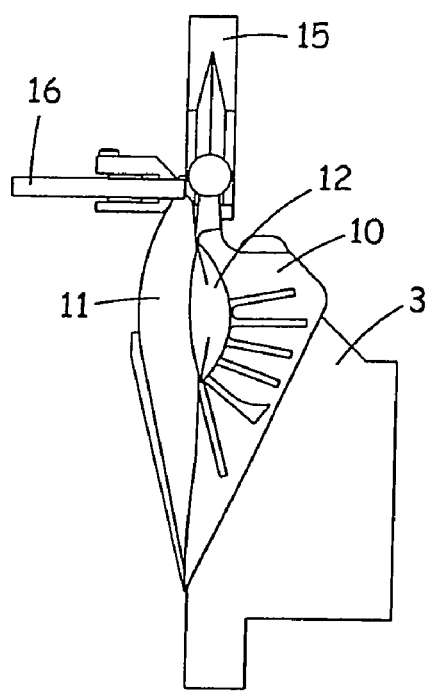

FIG. 5 corresponds to the position indicated in FIG. 1 with reference numeral 13.5, wherein the gripping element 16 has gripped the tendons 17 of the inner fillets 11.

Figure 6:
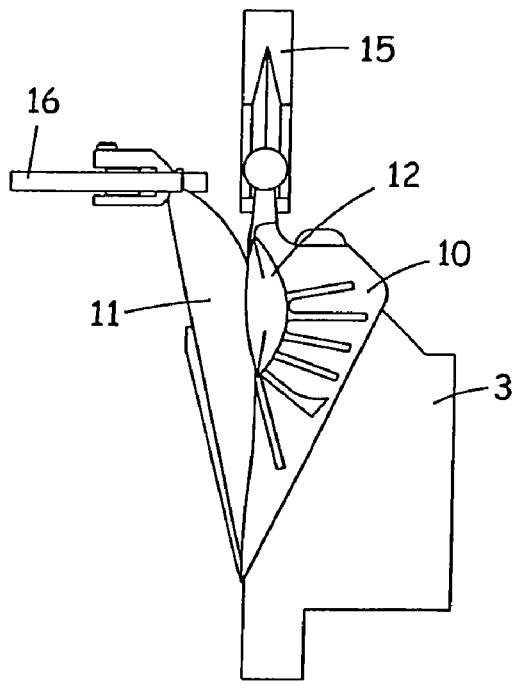

FIG. 6, which corresponds with reference numeral 13.6 in FIG. 1, shows that the gripping element 16 and the carrier 3 are moved relative to each other so as to pull, initially partially and over a first predetermined distance, the inner fillet 11 off the carcass part 10.

FIG. 6 shows the situation wherein the inner fillet 11 has been pulled over said first predetermined distance off the carcass part 10, and wherein the inner fillet 11 is at one side detached from the carcass part 10, while the remainder is still attached. At that moment, a membrane located between the inner fillet 11 and the subtender 12 is pulled taut, making it easy to tear the membrane.

Figure 7:
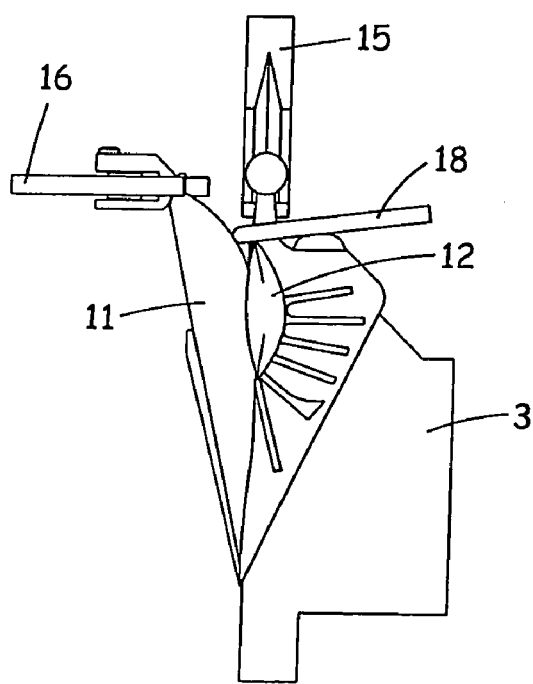

The tearing of the membrane between the inner fillet 11 and the subtender 12 just referred to it shown in FIG. 7, which corresponds to reference numeral 13.7 in FIG. 1. FIG. 7 shows that a scraping element 18 is activated, which tears the membrane between the inner fillet 11 and the subtender 12. The scraping element 18 then continues on its way downwards as shown in FIG. 8, which takes place near reference numeral 13.8 in FIG. 1.

FIG. 8 also shows that with the continuing downwards movement of the scraping element 18, the gripping element 16 and carrier 3 become further removed from each other, so as to continue pulling, over a second predetermined distance, the inner fillet 11 off the carcass part 10.

FIG. 9 shows the final situation where the inner fillet 11 is completely removed from the carcass part 10, which is realised at reference numeral 13.9 in the automatic filleting line illustrated in FIG. 1.

FIG. 9 also shows that the subtender 12 is then still attached to the carcass part 10. The carriers 3, carrying the carcass parts 10, subsequently continue in the direction of the operators 8 for further processing, after which the empty carriers 3 are available for a following production round.

As can be seen in FIG. 9, the harvested inner fillet 11 is suspended from the gripping element 16 owing to the gripping element 16 holding the inner fillet 11 near or at the tendon 17.

Near reference number 13.10 in FIG. 1, a cutting element 19 is brought into the vicinity of the gripping element 16, as shown in FIG. 10, for cutting the tendon 17 close to its insertion into the inner fillet 11.

For cutting element 19 it is possible to use, for example, two counter-rotational blades or a single rotating blade, with the inner fillet 11 being pushed against the rotating blade by means of a guide rail (not shown).

After the cutting element 19 has operated to separate the inner fillet 11 from the tendon 17, the harvested inner fillets 11 then are carried away on a conveyor belt 20 for further processing.

It will be appreciated by those skilled in the art that various modifications and variations can be made in the present invention without departing from the scope of the invention. It is intended that the present invention include such modifications and variations as come within the scope of the appended claims and their equivalents.

The invention claimed is:

1. A method for harvesting an inner fillet from poultry, the poultry having a tendon projecting from an inner fillet, the tendon connected to or previously connected to a wing bone of the poultry, the method comprising the steps of:
   gripping the tendon; and
   pulling the tendon and the inner fillet a first predetermined distance off a carcass of the poultry so as to at least partly detach the tendon and the inner fillet from the carcass.

2. A method for harvesting an inner fillet from poultry as in claim 1, further comprising the steps of:
   completely detaching the inner fillet from the carcass; and
   removing the tendon from the inner fillet.

3. A method for harvesting an inner fillet from poultry as in claim 2, wherein said step of removing the tendon from the inner fillet comprises cutting the poultry.

4. A method for harvesting an inner fillet from poultry as in claim 1, further comprising the step of positioning the tendon of the poultry in a first predetermined position prior to said gripping step.

5. A method for harvesting an inner fillet from poultry as in claim 1, wherein said step of pulling the tendon only partially removes the inner fillet from the carcass such that one part of the inner fillet is detached from the carcass while another part is still attached so that a membrane located between the inner fillet and a subtender of the poultry is extended so as to facilitate separation from the subtender, and further comprising the steps of scraping the poultry so as to tear the membrane while further pulling the tendon and the inner fillet a second predetermined distance such that the inner fillet is removed from the carcass while leaving the subtender on the carcass.

6. A method for harvesting an inner fillet from poultry as in claim 5, wherein the inner fillet comprises two parts, positioned on opposing sides of the poultry, and further comprising the step of moving a wedge towards the inner fillet and between the two parts so as to at least partially separate the two parts of the inner fillet.

7. A method for harvesting an inner fillet from poultry as in claim 6, further comprising the step of transporting the poultry along a conveyor during said steps of gripping the tendon, pulling the tendon, further pulling the tendon, and moving a wedge.

8. A method for harvesting an inner fillet from poultry as in claim 7, further comprising the step of removing the inner fillet from the conveyor track for further processing after said step of pulling the inner fillet a second predetermined distance.

9. A method of separating a pair of inner fillets from a carcass of poultry, each inner fillet having a tendon used to connect to a wing of the poultry, the method comprising the steps of:
   providing the poultry in a position where the tendon of each inner fillet extends from the poultry;
   separating at least a portion of the inner fillets near the tendons;
   gripping the tendons of the inner fillets;
   pulling the inner fillets at least partially from the carcass;
   tearing a membrane between the inner fillets and subtender of the poultry while pulling the inner fillets from the carcass so as to eventually separate the fillets from the carcass; and
   removing at least part of the tendons from the inner fillets.

10. A method for separating a pair of inner fillets from a carcass of poultry as in claim 9, further comprising the step of moving a wedge between at least a portion of the inner fillets.

11. A method for separating a pair of inner fillets from a carcass of poultry as in claim 10, wherein said tearing step comprises applying a cutting element to the membrane.

12. A method for separating a pair of inner fillets from a carcass of poultry as in claim 11, wherein said removing step comprises cutting the tendons.

13. An apparatus for harvesting an inner fillet from poultry, the poultry including a carcass and having a tendon extending from the inner fillet, the tendon being one that connects to a wing bone of the poultry, the apparatus comprising:
- a carrier for positioning the carcass of the poultry;
- a gripping element located proximate to the carrier and configured for gripping the tendons;
- a wedge positioned proximate to the carrier and configured for at least partially separating the two parts of the inner filet; and
- wherein the gripping element, the carrier, or both, or moveable relative to one another such that the inner fillet may be at least partially removed from the carcass.

14. An apparatus for harvesting an inner fillet from poultry as in claim 13, a cutting element positioned proximate to the gripping element, wherein the gripping element, the cutting element, or both are moveable relative to one another so that the cutting element may be used to sever the tendon.

15. An apparatus for harvesting an inner fillet from poultry as in claim 13, further comprising a scraping element positioned proximate to the carrier, and configured for damaging a membrane that extends between the inner fillet and a subtender.

16. An apparatus for harvesting an inner fillet from poultry as in claim 15, wherein the scraping element is configured for activation after the carrier and the gripping element are located in a first predetermined position relative to one another.

17. An apparatus for harvesting an inner fillet from poultry as in claim 16, wherein the scraping element is further configured to move a predetermined distance relative to the carcass as the gripping element and carrier are moved away from each other in order to continue separating the inner fillet from the carcass.

18. An apparatus for harvesting an inner fillet from poultry as in claim 13, wherein the wedge is positioned for engaging ends of a collar bone of the poultry.

19. An apparatus for harvesting an inner fillet from poultry as in claim 13, further comprising a conveyor track for transporting the carrier.

* * * * *